United States Patent [19]
Mulasmajic

[11] 3,719,395
[45] March 6, 1973

[54] MAGNETIC WHEEL
[76] Inventor: Dzemal Mulasmajic, 338 Pleasant Hill Boulevard, Palatine, Ill. 60067
[22] Filed: Aug. 30, 1971
[21] Appl. No.: 175,940

[52] U.S. Cl. ............301/5 R, 104/148 MS, 152/17, 301/136, 280/92
[51] Int. Cl. ........B06b 3/00, B60b 19/00, B60b 9/00
[58] Field of Search ........301/5, 133, 136; 152/1, 17; 335/206, 207, 284; 104/148 MS

[56] References Cited
UNITED STATES PATENTS

| | | |
|---|---|---|
| 408,465 | 8/1889 | Dewey............................104/148 MS |
| 833,635 | 10/1906 | Rogers............................104/148 MS |
| 3,125,964 | 3/1964 | Silverman......................104/148 MS |

Primary Examiner—Richard J. Johnson
Assistant Examiner—R. Eisenzopf
Attorney—Carlton Hill et al.

[57] ABSTRACT

A magnetic wheel for supporting a vehicle employs a permanent magnet in the shape of a ring which is journalled for rotation about a shaft. The shaft is loosely coupled to the frame of the vehicle for vertical movement by means of a member which positions a magnet within the ring which is poled to repel the ring. The wheel is adapted for steering by providing that the loose coupling includes a pivotal coupling and by providing a lever arm for connection to a steering mechanism, such as a rack and pinion mechanism.

8 Claims, 4 Drawing Figures

PATENTED MAR 6 1973　　　　　　　　　　　　　　　3,719,395
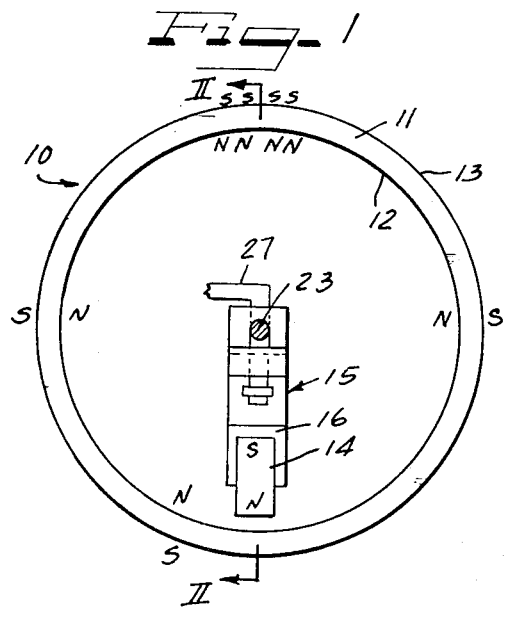
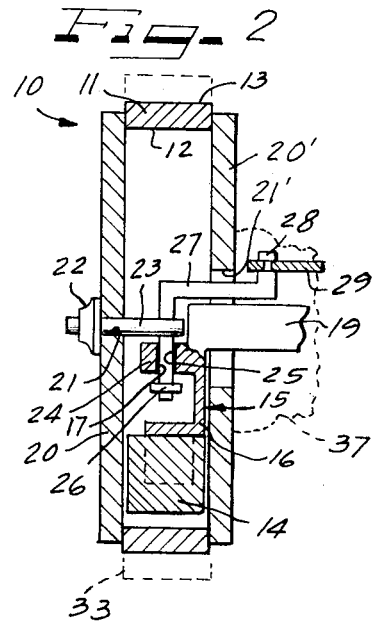
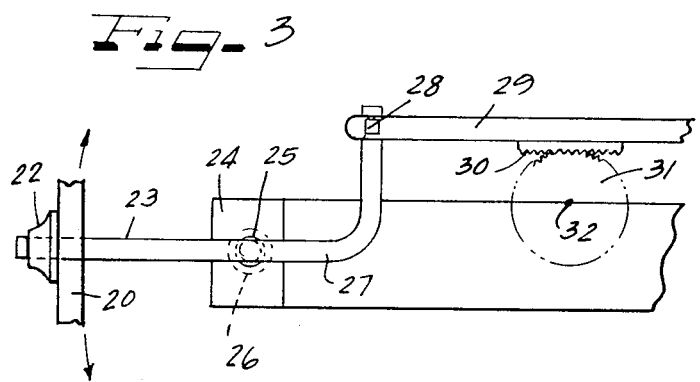
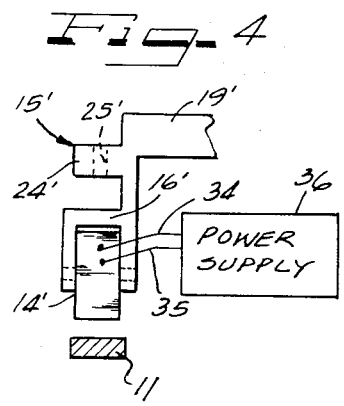
INVENTOR.
DZEMAL MULASMAJIC
BY　Hill, Sherman, Meroni, Gross & Simpson　ATTORNEYS

MAGNETIC WHEEL

BACKGROUND OF THE INVENTION

1. Field of the Invention

This invention relates to wheels and is more particularly concerned with the provision of a wheel for magnetically supporting a vehicle.

2. Description of the Prior Art

The art of magnetism in general has taken particular cognizance of the many benefits offered through the utilization of the forces of attraction and repulsion provided by magnets. These forces have been utilized to great advantage in magnetic bearings, for example. However, magnetic bearing structures require a design which may become quite complicated in that it is desired to maintain the rotating mechanism aligned with respect to its axis of rotation. In the field of transportation, there have been several attempts to utilize magnetic bearing structures to relieve and support loads on, for example, railway cars. These techniques have generally employed the provision of electromagnets having many winding turns in order to provide sufficient lifting forces for the vehicle. In transportation systems, there is also the difficulty of feeding the electromagnets by means of rails or the like.

SUMMARY OF THE INVENTION

The primary object of the present invention is to provide a magnetic wheel of simple construction for supporting vehicles, the wheel, according to a feature of the invention, being rotatable about an axis which is not fixed, and which is rendered free for vertical movement with respect to the associated vehicle by means of a unique wheel to frame coupling.

It is a still further object of the invention to provide a magnetic wheel that is freely rotatable about a horizontal axis for movement of the associated vehicle and further freely pivotal about a vertical axis for steering the associated vehicle.

BRIEF DESCRIPTION OF THE DRAWING

Other objects, features and advantages of the invention, its organization, construction and operation will be best understood from the following detailed description of an embodiment thereof taken in conjunction with the accompanying drawing, in which:

FIG. 1 is an elevational view of a magnetic wheel constructed in accordance with the principles of the present invention;

FIG. 2 is a sectional view of the wheel of FIG. 1 taken substantially along the parting line II—II of FIG. 1;

FIG. 3 is a top plan view of a steering mechanism which may be employed with the wheel of FIGS. 1 and 2; and FIG. 4 illustrates a portion of the apparatus of FIGS. 1 and 2 wherein an electromagnet is employed.

DESCRIPTION OF THE PREFERRED EMBODIMENT

In FIG. 1 there is illustrated a wheel 10 which comprises a ring 11 magnetized across its thickness with its inner surface 12 and its outer surface 13 being at opposite magnetic polarities, for example, north and south poles, respectively. A permanent magnet 14 is disposed within the ring 11 and is magnetized to have, for example, a north pole at its lower side and a south pole at its upper side, whereby the permanent magnet 14 is repelled from the permanent magnet 11.

Referring to FIG. 2, a more detailed view of the apparatus of FIG. 1 is illustrated. The permanent magnet 14 is mounted within the magnetic ring 11 by means of a member 15 having an arm 16 for receiving the magnet 14 which may be secured by any suitable means. The member 15 also includes an arm 19 for attachment to the associated vehicle.

Also shown in FIG. 2, but not in FIG. 1, is a disc 20 which may be secured to the edge of the ring 11 by any suitable means. The disc 20 includes an aperture 21 and carries a bearing 22 for rotatably mounting a shaft 23. With the bearing 22 fixed to the disc 20, the ring 11 is journalled for rotation about the shaft 23. A similar disc 20' with an aperture 21' and a flexible boot 37 may be utilized as a sealing means to prevent foreign matter from entering the ring 11. The member 15 includes a further arm 24 having a bore 25 with a bushing 17 therein for receiving a pin, machine screw or the like 26 which is secured to the shaft 23. The pin 26 and the bore 25 are dimensioned so as to permit relative vertical movement between the member 15 and the shaft 23 as forces of loading of the vehicle are changed. The part 26 will stop overloading before the magnet 14 touches the ring 11.

The bore 25 and the pin 26 may be shaped to restrict movement about a vertical axis thereof, ut they may also be shaped to form a pivot about such vertical axis and the wheel 10 may be further provided with apparatus for steering the associated vehicle. Such apparatus may advantageously include a lever 27 which is pivotally connected at 28 to a steering linkage 29. In FIG. 3, this apparatus is illustrated for use with a rack and pinion mechanism wherein a rack 30 is carried on the steering linkage 29 and a pinion 31 is rotatably mounted for movement about an axis 32 whereby the elements 29, 27 and 23 pivot about vertical axes defined by the elements 26 and 28 to pivot the disc 20 and, accordingly, the ring 11 of the wheel 10. The rack 30 is of a width which will permit relative vertical movement of the pinion 31.

As illustrated in phantom in FIG. 2, the wheel 10 may be provided with a tire or the like 33 which is shaped to conform to the supporting surface, The supporting surface mentioned above may be any usual land surface including railway rails; however, the present invention when utilized for railway type applications, obviates the necessity for rails in that the diameter of the ring 11 is substantial with respect to the small concentrated area of magnetic repulsion between the ring 11 and the magnet 14 so that it appears as a flat surface and rotation thereof is, in effect, a continuous rail laying process. The substantially flat inner surface 12 of the ring 11 with respect to the magnet 14, and the width of the magnet 14 with respect to the width of the ring 11 permits an extensive arc of pivoting about the pin 26 without experiencing substantial changes in the forces of repulsion in that the ring 11 appears to the magnet 14 as a substantially flat surface in all directions.

Referring to FIG. 4, the variation of the above structure is illustrated wherein a member 15' of similar structure with respect to the member 15 is provided for supporting an electromagnet 14' by means of an arm arrangement 16'. The electromagnet 14' includes terminals for connection to a power supply 36 by way of a pair of conductors 34, 35. The power supply 36 may advantageously be carried by the associated vehicle or, if desired, the power supply 36 may be extended to the vehicle by means of a rail system in a manner known per se.

Since a wheel constructed according to the present invention is substantially free of friction, a low power drive may be employed to drive the vehicle, such as a propeller or friction wheel drive.

Although I have described my invention by reference to a particular illustrative embodiment thereof, many changes and modifications of my invention may become apparent to those skilled in the art without departing from the spirit and scope thereof, and it is to be understood that I intend to include within the patent warranted hereon all such changes and modifications as may reasonably and properly be included within the scope of my contribution to the art.

I claim:

1. A magnetic wheel comprising:
    a metal ring having an inner surface and an outer surface and permanently magnetized in a direction extending from one of said surfaces to the other;
    a disc connected to one edge of said ring and including an aperture which is concentric with the axis of said ring;
    a bearing carried on said disc and a shaft having one end thereof extending through said aperture and mounted in said bearing for rotation of said disc and ring thereabout and another end disposed within said ring;
    a magnet and means for connection to a vehicle frame mounting said magnet within said ring below said shaft and adjacent said inner surface, said magnet having a magnetic polarity such that a repelling force is provided between said magnet and said ring, said mounting means including an arm extending below said shaft and having a bore therein; and
    a pin depending from said shaft and extending through said bore for permitting free movement between said magnet and said ring in response to loading changes of the vehicle.

2. A magnetic wheel according to claim 1, comprising lever means connected to said shaft and responsive to the application of a force thereto to pivot said shaft about said pin for steering the vehicle.

3. A magnetic wheel according to claim 1, wherein said magnet is a permanent magnet.

4. A magnetic wheel according to claim 1, wherein said magnet is an electromagnet including terminals for connection to an energizing source.

5. A magnetic wheel according to claim 1, comprising sealing means secured to the other edge of said ring for keeping foreign matter from entering the interior of said ring.

6. A wheel for magnetically supporting a vehicle comprising:
    a shaft;
    a permanent magnet ring journalled for rotation about said shaft;
    a magnet disposed below said shaft within said ring and having a magnetic polarity for urging said magnet away from said ring;
    means for connection to a vehicle mounting said magnet; and
    coupling means coupling said shaft and said mounting means for relative vertical movement.

7. A magnetic wheel according to claim 6, wherein said coupling means includes means providing a generally vertical axis pivotal coupling between said shaft and said mounting means, and said wheel further comprises means connected to said shaft to pivot the same about the vertical axis for steering the vehicle.

8. A magnetic wheel according to claim 6, wherein said coupling means includes a portion of said shaft and a portion of said mounting means, a bore in one of said portions and a pin secured to the other of said portions and extending through said bore.

* * * * *